C. E. BEARD.
RESILIENT TIRE FOR VEHICLES.
APPLICATION FILED AUG. 4, 1910.

1,131,313.

Patented Mar. 9, 1915.

WITNESSES:

INVENTOR
Clement E. Beard
BY
Brown & Hopkins
ATTORNEYS

UNITED STATES PATENT OFFICE.

CLEMENT E. BEARD, OF COLUMBIANA, OHIO.

RESILIENT TIRE FOR VEHICLES.

1,131,313. Specification of Letters Patent. Patented Mar. 9, 1915.

Application filed August 4, 1910. Serial No. 575,453.

*To all whom it may concern:*

Be it known that I, CLEMENT E. BEARD, a citizen of the United States, and resident of Columbiana, Ohio, have invented a certain new and useful Improvement in Resilient Tires for Vehicles, of which the following is a specification.

My invention relates to wheels for vehicles and one of its objects is the provision of simple and durable mechanical cushioning means for tires of vehicles, particularly automobiles.

A further object is the provision of means comprising springs always under tension, for cushioning the solid tire of a vehicle wheel.

Another object of the present invention is the provision of a flexible or resilient tire for vehicle wheels, by the use of which the traction power necessary to propel the car will be reduced.

A further object of the invention is the provision of mechanical flexible tire mechanism which can be placed on any of the usual wheels of its class, reduce the raising of dust on the road, be free from the puncture troubles of pneumatic tires and yet having a resiliency approaching very nearly that of a pneumatic tire, and have a period of usefulness equal to the remainder of the car.

Other objects of the invention will appear hereinafter, the novel combinations of parts being set forth in the appended claims.

Figure 1:
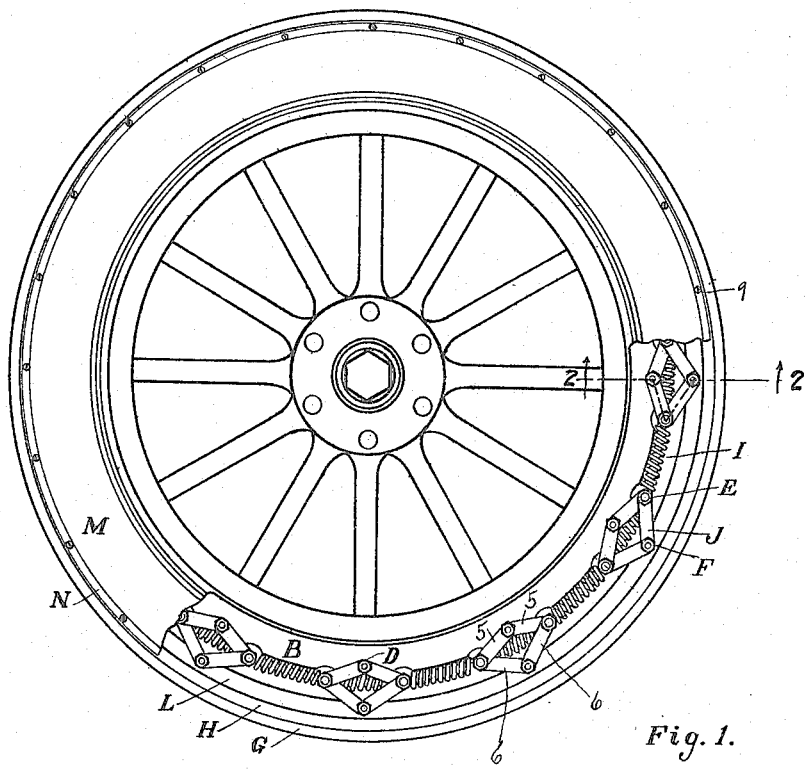
Figure 2:
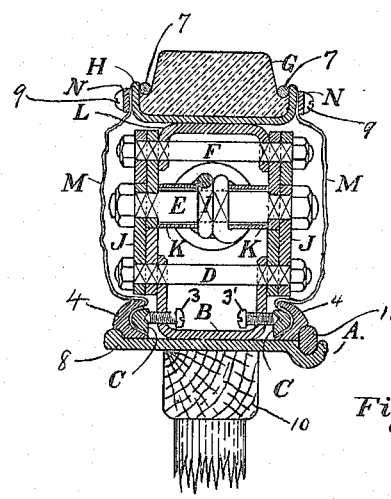

In the accompanying drawings, Figure 1 represents in elevation an automobile wheel with a portion broken away to show my invention embodied therein; Fig. 2 is a cross sectional view of the rims and tire of Fig. 1 on the line 2—2, looking in the direction of the arrows.

Referring to the drawings, A designates a rim on the felly 10 of an automobile wheel, the construction of which is well known so that detailed description thereof is unnecessary. On the outer peripheral surface of the hoop 8 near the edges thereof are mounted the detachable flanges 4, 4, and the locking ring 11.

B designates an inner steel rim of the tire, which rim fits closely on the peripheral surface of the rim A. The rim A, in this instance, is such that the rim B may be easily slipped into place before the tire clenching mechanism is locked in place. As shown in Fig. 2, the rim B is U-shaped in cross-section and is held in adjusted central position on the rim of the wheel by means of a plurality of set screws 3, 3' which extend through threaded openings spaced apart around the rim B. These set screws also bear against the clamp rings C, C lying in the annular grooves in the outer clencher rings 4, 4. Extending through the outer portion of the U-shaped rim B are bolts or rods D which serve as supports for the inner arms 5, 5 of the quadrilateral connections J.

E designates intermediate supporting bolts for the outer ends of the arms 5 and the inner ends of the arms 6, these bolts also serving as a means for connecting the springs I to the quadrilateral toggles, there being one spring connected between the ends of the quadrilateral toggle and a spring connected between each end of a quadrilateral toggle and the end of the next succeeding quadrilateral toggle.

F designates the outer supporting bolts for the quadrilateral toggle arms 6, 6, these bolts also passing through the steel rim L which fits within the tire rim H. The rim L is inverted U-shaped in cross-section and serves to support the rods F at points spaced apart and corresponding in number and distance to the points of location of the bolts D. The outer tread rim H is U-shaped in cross-section and contains the solid rubber tire G which may be clenched in position by the wires 7, 7, if desired.

K, K designate steel collars or sleeves which fit loosely on the bolts E, one on each side of the ends of the springs I and between the latter and the movable ends of the arms 5, 6. The ends of the springs I fit closely on the rods E and therefore the collars K, K abut against said ends; the springs I are held centrally of the flexible tire considered in its entirety.

The rim H may be shrunk on to the rim L so as to make a tight fit thereon or they may be riveted together to prevent either circumferential or lateral movement with respect to each other, or the rims H and L may be integral. It should also be noted that, if desired, the rim B may be placed directly on the wooden felly 10 of the wheel and suitable means provided for fastening the covering M, M thereto. This might be preferable when the cushioning mechanism is placed on the wheel at the factory. In such case the rim B could be riveted to the metal rim already on the wheel or if the entire wheel is being manufactured the parts 4, 4 and 8 could be made in one piece and the clencher wire 11 and grooved extension in which it fits, omitted.

In order to protect the springs, toggles and connections from water and dirt, annular strips of rubber or canvas M, M are securely fastened, at their inner edges to the rim A by means of the clamping rings 4, 4 and C, C and are likewise securely fastened at their outer edges to the tread rim H, by means of the clamp rings N, N and screws 9, 9.

In the drawings I have shown twenty-four separate springs connected to twelve quadrilateral toggles, each of the latter being located near the outer end of a spoke of the wheel. It should be understood, however, that the number of springs and toggles may be varied and so also their location but I prefer to make the springs of equal length and substantially of equal tension and space the quadrilateral toggles equal distances apart. Although the springs I may be endless, I prefer to make them separate, as shown, to facilitate assembling the parts during manufacture and to save time and expense in repairing a broken section of the spring. Furthermore all bolts may be provided with lock-nuts, if desired. In heavy vehicles the wheels may be provided with a duplicate set of springs and toggles.

In the operation of the spring cushion tire described, the springs always act under tension and tend to move the quadrilateral toggles into the normal positions shown in the drawing. All joints or pivotal connections including the spring connections, being movable are free to assume any position within their limits of movement, due to shocks received from road conditions. Relatively speaking, the outer tire moves as a whole in a vertical direction when given a sudden jolt or shock, the springs and toggles automatically adjusting themselves to the new conditions and restoring the tire automatically to its initial or normal position when the shock has spent its force, thus giving the whole tire, including the outer and inner rims and intermediate mechanism a resiliency approaching very nearly that of a pneumatic rubber tube.

The driving force as applied to the rear wheels of an automobile, when starting, or when changing gears suddenly, tends to produce about the same movement and effects in the tire as does a road shock and therefore when my invention is employed the shocks received by the occupants of the car are reduced and also as a consequence the life of the car is lengthened.

It should be particularly noted that the springs are always subjected to tension, that is, they are always under a stretching strain and never compressed. Furthermore, they are never subjected to any torsional strains. The objection to springs being subjected to a combination of different strains is that they will soon crystallize and break or become overheated under such treatment. The quadrilateral toggles of the portion of the wheel near the road will be extended pulling apart the springs inside of them, the springs between the ends of the quadrilateral toggles remaining in tension, while the upper portion of the wheel will draw the intermediate springs apart and reduce the length of the inside springs, the tension of all the springs being sufficient to prevent the inner or outer rims from striking the springs or cross bolts even when the wheel is given severe shocks or jolts. It should also be noted that when strong torque is applied to the rear wheels to start the automobile or when there is any sudden change in such torque, the transmission thereof to the outer rim is cushioned by the spring mechanism while nevertheless power to the outer rim is transmitted positively through the quadrilateral toggles.

Obviously those skilled in the art may make various changes in the details and arrangement of parts without departing from the spirit and scope of my invention as defined by the claims and I wish therefore not to be limited to the precise construction herein disclosed.

What I claim and desire to have secured by Letters Patent of the United States, is:—

1. The combination with a wheel, of an inner ring U-shaped in cross-section mounted on the rim of said wheel, an outer ring inverted U-shaped in cross-section, toggle link connections between the inner ring and the outer ring on both sides thereof, a series of bolts spaced apart and extending through said inner ring to connect the toggle links thereto, a corresponding series of bolts spaced apart and extending through the outer ring to connect the toggle links thereto, springs between the free ends of the said toggle link, intermediate cross bolts between the ends of the toggles, sleeves on said intermediate cross bolts for centering the springs, and an outer tread rim around said outer ring.

2. The combination with a wheel, of an inner ring U-shaped in cross-section, means for connecting said ring and rim of said wheel, an outer ring inverted U-shaped in cross-section, a double set of toggle link connections between the inner and outer rings, a continuous series of tension springs connected to the joints of the toggles, and centering mechanism to hold the springs between the toggle connections out of lateral contact therewith and out of contact with either the inner or outer rings.

In testimony whereof I have signed my name to this specification, in the presence of two subscribing witnesses, on this 27" day of July, A. D. 1910.

CLEMENT E. BEARD.

Witnesses:
 NORA HAVIL,
 WILLIAM O. WALLACE.

Copies of this patent may be obtained for five cents each, by addressing the "Commissioner of Patents, Washington, D. C."